United States Patent [19]
Jarvis

[11] Patent Number: 4,739,581
[45] Date of Patent: Apr. 26, 1988

[54] FLOWER POT

[76] Inventor: Eugene R. Jarvis, 1049 Glenwood Ave., Hagerstown, Md. 21740

[21] Appl. No.: 940,797

[22] Filed: Dec. 12, 1986

[51] Int. Cl.⁴ .............................................. A01G 9/02
[52] U.S. Cl. ........................................... 47/66; 47/80
[58] Field of Search .................. 47/66, 71, 80, 81, 79, 47/39, 18

[56] References Cited
U.S. PATENT DOCUMENTS
2,249,197  7/1941  Brundin .............................. 47/71 X

*Primary Examiner*—Robert A. Hafer
*Assistant Examiner*—Danton D. DeMille
*Attorney, Agent, or Firm*—Charles L. Lovercheck; Wayne L. Lovercheck; Dale R. Lovercheck

[57] ABSTRACT

A flower pot having a drainage tray, an outer shell supported on said drainage tray, an upper insert, a lower insert and a top block. The upper insert is disposed between the lower insert and the top block. A soil groove is provided in the upper insert for receiving soil to determine the wetness of the soil above the top block.

12 Claims, 5 Drawing Sheets

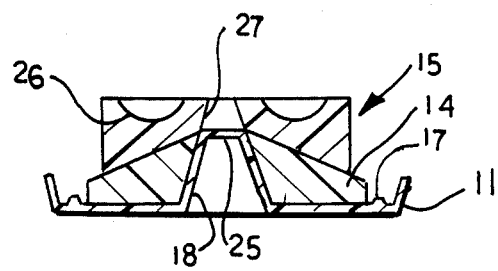
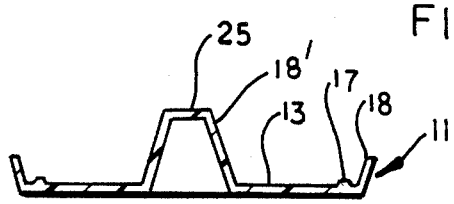
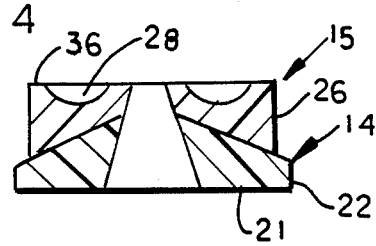
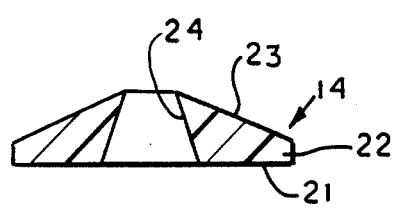
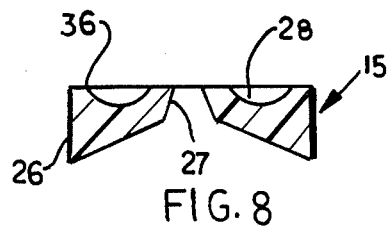
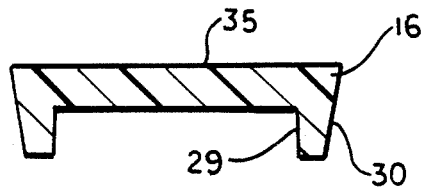
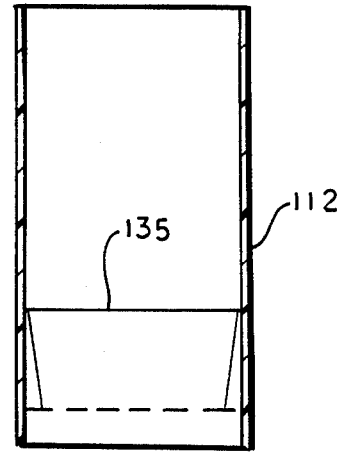

4,739,581

FLOWER POT

BACKGROUND OF THE INVENTION

Overwatering has long been a problem in connection with potted plants. When excess water is introduced into the pot containing a plant, the excess water is inclined to accumulate adjacent the bottom of th epot and root rot or root ball wetness may occur on the bottom of the root ball. Root rot is affect by excess water.

GENERAL STATEMENT OF THE INVENTION

This invention relates to a pot for potted plants wherein problems resulting from over watering are eliminated.

A porous block material insert bottom gives excellent drainage capabilities, eliminates root rotting puddles of water inside the pot and eliminates most negative results from overwatering. The block material insert bottom gives excellent anchorage, especially when used with a locating stake or bracket.

A soil groove checking method is provided which gives an accurate check of wetness on the bottom of a root ball as soil on bottom of root ball and soil in the checking groove will have approximately the same degree of wetness after a short drainage period.

The combination of block material and a concrete bottom insert prevents water from leeching upward from the drainage tray, thus giving a more accurate check at the soil groove. The bottom can also be made thinner, if desired, when making larger pots, using a combination of materials.

A soil groove design in the form of a half circle is preferable since there are no thin edges and it improves the accuracy of the wetness check over previous designs.

A circle of lugs molded on the drainage tray allows for firmer seating of the upper bottom insert when the shell of a pot is placed thereon. This also allows for some flexibility in seating of the lower half of the insert bottom. The lugs also provide a space which allows for adequate ventilation and flow passage around the bottom of the outer shell, preventing water from becoming stagnant and preventing any unwanted odors.

The basic idea disclosed also applies to planter boxes as well as to flower pots.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWINGS

FIG. 4 is a longitudinal cross-sectional view of the drainage tray, the upper insert and lower insert in place;

FIG. 5 is a longitudinal cross-sectional view of the drainage tray;

FIG. 6 is a longitudinal cross-sectional view of the upper insert and lower insert;

FIG. 7 is a longitudinal cross-sectional view of the lower insert;

FIG. 8 is a longitudinal cross-sectional view of the upper insert;

FIG. 9 is a longitudinal cross-sectional view of the upper block;

FIG. 11 is a cross sectional view of the outer shell cut from soil pipe with retainer required to hold the upper half of bottom in place;

DETAILED DESCRIPTION OF THE DRAWINGS

Figure 1:
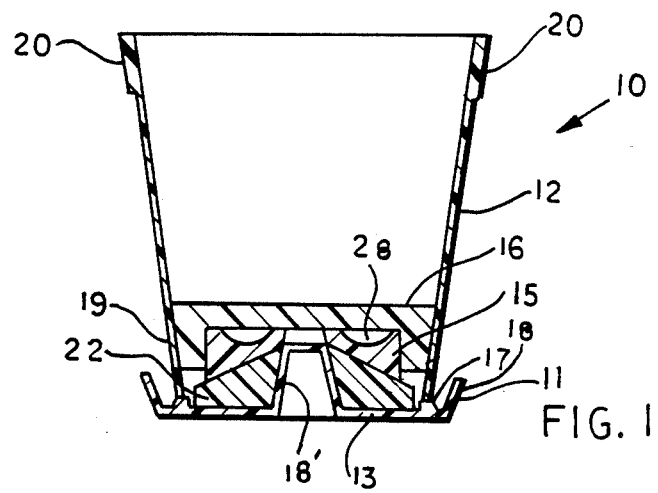
FIG. 1 is a longitudinal cross-sectional view of the complete assembly according to the invention.
Figure 2:
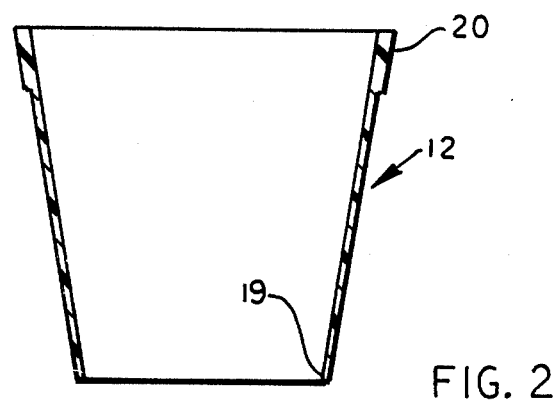
FIG. 2 is a longitudinal cross-sectional view of the outer shell of the flower pot.
Figure 3:
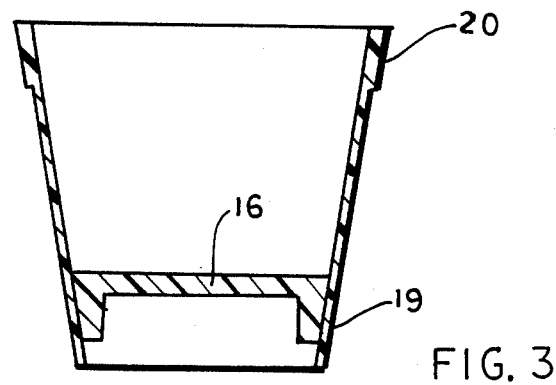
FIG. 3 is a longitudinal cross-sectional view of the outer shell of the flower pot with the upper block in place.
Figure 10:
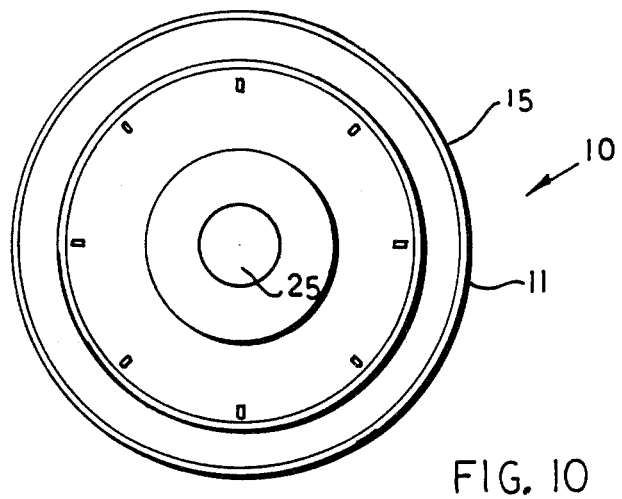
FIG. 10 is a top view of the drainage tray.
Figure 12:
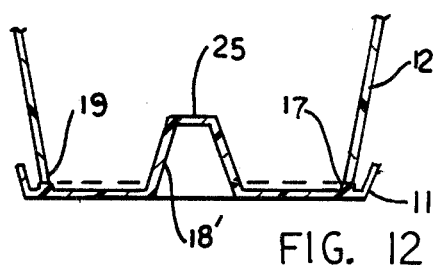
FIG. 12 is a partial cross sectional view of the drainage tray and outer shell of the flower pot.

Now with more particular reference to the drawings, I show a combination 10 of a drainage tray 11, an outer shell 12, a lower insert 14 and an upper insert 15, and an upper block 16. The drainage tray 11 has a flat bottom 13 with upwardly and outwardly extending side walls 18 and spaced upwardly extending lugs 17 attached to the bottom 13. The lugs 17 are disposed in a row equally spaced from the side walls 18. An upwardly extending protrusion 18' is attached to bottom 13 at its center and extends upwardly from the bottom 13 and is spaced symmetrically from the upwardly extending side walls 18. The protrusion 18' has a flat top 25.

Outer shell 12 is made of water impervious material and is supported on lugs 17 and is generally cylindrical and has a lower circular end 19 and an upper circular end 20. The lower end 19 is substantially smaller than upper end 20. Lower end 19 of shell 12 rests on lugs 17 whereby the first end of the side wall is held in spaced relation to the bottom 13 and provides a space for water to run under and for ventilation.

Lower insert 14 is made of concrete or similar block material. Lower insert 14 has generally flat bottom 21 and generally cylindrical side walls 22, frustoconical top 23 and central bore 24. Central bore 24 is defined by a general frustoconical surface. The flat bottom 21 of the lower insert 14 rests on the flat bottom 13 of the drainage tray 11. The flat top of the protrusion of the drainage tray 11 extends above the frustonical top surface 23 of the lower insert 14 and into hole 27 in upper insert 15.

Upper insert 15 is made of a porous material having the characteristic of cement cinder blocks. Upper insert 15 have a generally cylindrical outer peripher 26, generally flat top surface side and a frustoconical central bore 27 and a semicircular circulare groove 28 in the upper side 36. Upper block 16, made of concrete, has an outer generally cylindrical peripheral surface 30 of slightly greater diameter than that of power insert 14, and a lower bore providing a downwardly extending flange 29, which is disposed around upper insert 15 around the outside of the soil groove 28. The upper block 16 has a flat top surface 35 on which soil can be supported.

Locating stake 40 has a ground insertable point 41 and a head 42 which is frustoconical in shape with a bore 32 and couterbore 32' for a screw head to secure the had 42 to the pint 42. Said stake 40 can be received in the frustoconical recess in protrusion 18' to secure the device to the ground.

The cylindrical outer shell 112 and retainer 135, shown in FIG. 11, can be substituted for the outer shell 12 of the other embodiments of the invention.

The flower pot can be assembled as in FIG. 1, soil put in groove 28 and the block 16 is put in place and potting soil placed in outer shell 12. The plant can then be put in place and normal watering commenced.

Now with more particular reference to the embodiment of the invention shown in FIGS. 14 through 22, I show a planter 110 having outer shell 113 which may be generally rectangular in shape and a drainage tray 111. The drainage tray 111 has a lower insert 114, an upper insert 115 and a top block 116. The bottom of the drainage tray 11 has spaced protrusions 118' extending upwardly from the bottom. Protrusions 118' have an outer frustoconical surface and a top 125. Protrusions 118' extend through openings in the lower insert 114 through openings in the upper insert 115. Upper insert 115 has a soil groove 216. Drainage tray 111 has an outer upwardly extending side walls 118. Upwardly extending lugs 117 are attached to the bottom of drainage tray 111 and are disposed in a row equally spaced from side walls 118. The lower insert 114 is placed over the protrusions 118'. A soil groove 216 is formed around the inner periphery of the insert of the upper insert 115. A top block 116 is supported over the upper insert 115. Recesses 119 are formed in the upper and lower inserts to receive protrusions 118'.

Figures 13, 13A, 13B:
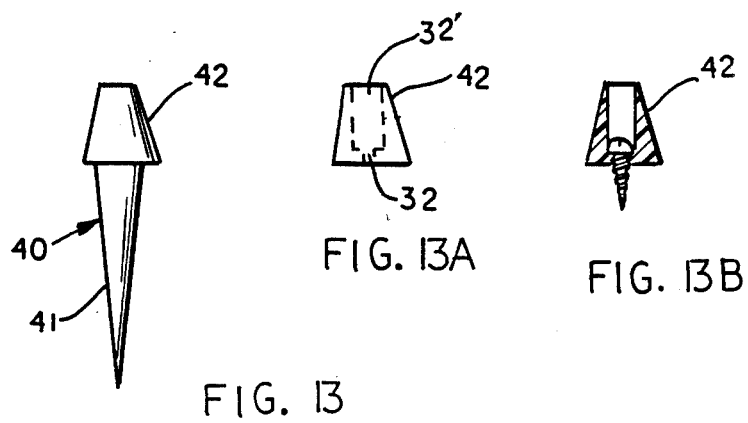
FIG. 13 is a side view of a support stake.
FIG. 13A is a side view of the head of the stake shown in FIG. 13.
FIG. 13B is a cross sectional view of the head of the stake shown in FIG. 13A.
Figure 14:
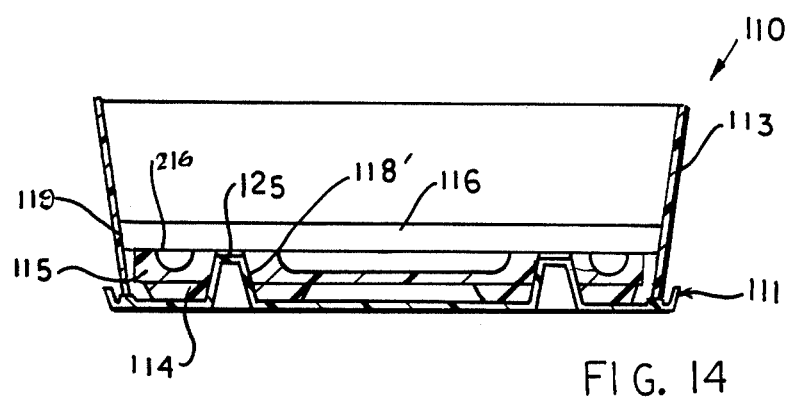
FIG. 14 is a longitudinal cross-sectional view of a complete assembly of a planter and inserts according to the invention.
Figure 15:
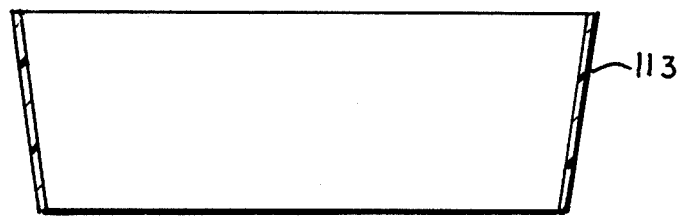
FIG. 15 is a longitudinal cross-sectional view of the outer shell.
Figure 16:
FIG. 16 is a longitudinal cross-sectional view of the drainage tray.
Figure 17:
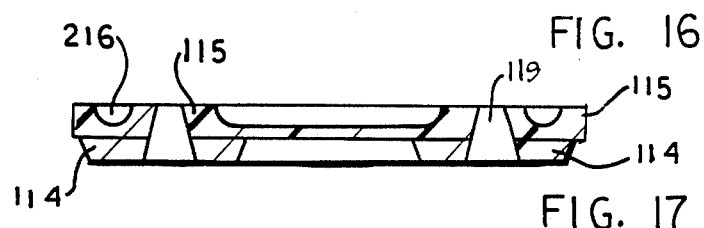
FIG. 17 is a longitudinal cross-sectional view of the lower insert and the upper insert.
Figure 18:
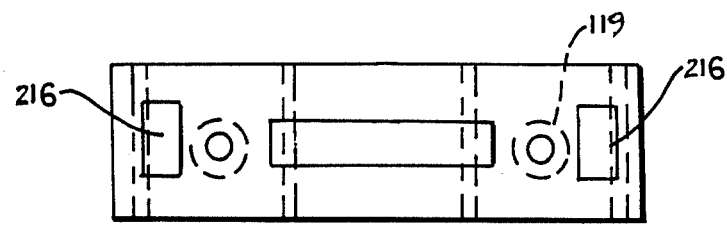
FIG. 18 is a top view of the upper insert as shown in FIG. 17.
Figure 19:
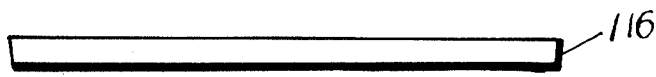
FIG. 19 is a side view of the top block.
Figure 20:
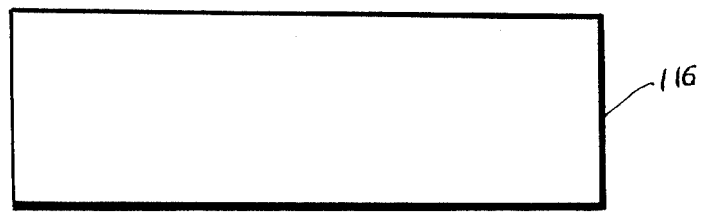
FIG. 20 is a top view of the top block.
Figure 21:
FIG. 21 is a partial longitudinal cross sectional view of the of the shell and drainage tray; and, FIG. 22 is a top view of the drainage tray.
Figure 22:
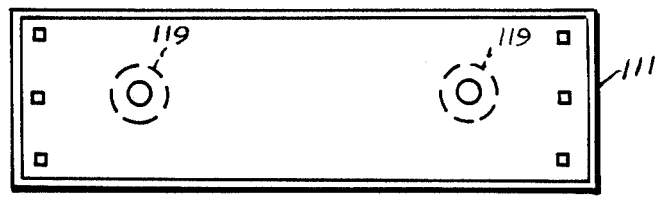

It will be noted that the porous block material lower insert 114 provides excellent drainage capabilities and prevents root rotting puddles of water and eliminates inside rot, eliminating most negative results of overwatering. The block material lower insert 114 gives an excellent anchorage. The planter shown in FIGS. 12 through 22 can be used with locating stakes 40, such as shown in FIGS. 13, 13A and 13B. The stakes 40 may be driven into the ground and the head 42 with its frustoconical shape inserted into the protrusion 118' which holds the assembly in place. To check the soil moisture content of the device the outer shell is raised up and separated from the tray to leave the lower and upper inserts in the tray. The upper block remains in the outer shell to hold the soil therein. The soil groove in the upper insert is thereby exposed for checking the moisture content. By checking the soil groove, an accurate check of the root ball wetness on the bottom of the root ball and soil on the bottom of the root ball above the block can be made. A novel method is provided which is based on the knowledge that a groove containing soil as set forth herein will have approximately the same degree of wetness after a short drainage period as said at the root ball.

The concrete block material gets its porosity and drainage capabilities from a special block mixture. Water will not be seep up in large enough quantities so as to be detrimental to the operation of the device. Very little water will transfer from one insert to another upward because of the break of seam between block material inserts. The combination block material and cement and the concrete bottom insert redness water from leeching upward from the drainage tray and promotes water drainage, thus giving a more accurate check at the soil groove. The lugs on the bottom of the drainage tray allow for firmer seating of the upper bottom insert when the shell of the pot is placed on it. This also allows for some flexibility in seating of the lower inserts bottom which it also allows for adequate ventilation around the bottom of the outer shell preventing water from being stagnated and from preventing any unwanted odor.

The foregoing specification sets forth the invention in its preferred, practical forms but the structure shown in capable of modification within a range of equivalents without departing from the invention which is to be understood is broadly novel as is commensurate with the appended claims.

The embodiments of the invention in which an exclusive property or privilege is claimed are defined as follows:

1. In combination a drainage tray, an outer shell and a lower insert and an upper insert and an upper block,
   said drainage tray having a flat bottom, upwardly and outwardly extending side walls and spacer means,
   locating means on said bottom and extending upwardly from said bottom for locating the lower and upper inserts in the drainage tray,
   a first end of said shell resting on said spacer means whereby said first end of said side wall is held in spaced relation to said bottom and generally concentric thereto,
   said drainage tray includes said lower insert located within said outer shell and said upper insert is supported on said lower insert and disposed above said upper insert.
   an upper block supported on said upper insert and disposed above said upper insert,
   said upper insert being made of porous material,
   a soil groove in the top surface of said upper insert receiving soil whereby the wetness of said soil can be determined by inspecting the wetness of said soil in said soil groove.

2. The combination recited in claim 1 wherein said upper block is made of concrete-like material.

3. The combination recited in claim 2 wherein said shell is rectangular in shape,
   said upper insert is generally rectangular in shape and said groove is generally rectangular in shape.

4. The combination recited in claim 3 wherein said lower insert is rectangular in shape.

5. The combination recited in claim 1 wherein said upper insert is rigid and is made of porous material having the characteristic of porosity of cinder block.

6. The combination recited in claim 1 wherein said lower insert is made of a material having characteristics of concrete.

7. The combination recited in claim 1 wherein said upper insert has the characteristic of porosity of cinder block or porous concrete block material.

8. The combination recited in claim 1 wherein said bottom has a protrusion extending upwardly therefrom, said protrusion is received in a recess in the bottom of said lower insert whereby said lower insert is held in place.

9. The combination recited in claim 8 wherein said lower insert has two spaced frustoconical holes therein, said drainage tray has two spaced protrusions received in said frustoconical holes whereby said lower insert is held in place.

10. The combination recited in claim 9 wherein said lower insert has a generally frustoconical top surface, said upper insert has a concave lower surface, a flat top surface generally complementary in shape to the bottom surface of said lower insert.

11. The combination recited in claim 10 wherein a top block is supported in said shell above said upper insert, said top block having a downwardly extending flange surrounding said upper insert.

12. In combination a drainage tray, an outer shell and a lower insert and an upper insert and an upper block, said drainage tray having a flat bottom, uppwardly and outwardly extending side walls, spaced upwardly extending lugs attached to said bottom, said lugs being disposed in a row equally spaced from said side walls,
an upwardly extending protrusion attached to said bottom and extending upwardly from said bottom and spaced from said upwardly and outwardly extending side walls,
said protrusion having a flat top,
said outer shell being in the form of a hollow generally cylindrical member,
said outer shell having a first circular end, and a second circular end,
said first circular end being substantially smaller than said second circular end,
said first circular end of said shell resting on said lugs whereby said first end of said side wall is held in spaced relation to said bottom and generally concentric thereto,
said lower insert located in said drainage tray within said outer shell having a generally flat bottom and a generally cylindrical side wall and being made of concrete,
an upper insert being made of porous material resting on said lower insert,
an upper block supported on said upper insert and disposed above said upper insert,
an upwardly facing said groove in said upper insert receiving soil whereby the wetness of said soil can be determined by inspecting the wetness of the soil in said soil groove.

* * * * *